Patented June 20, 1939

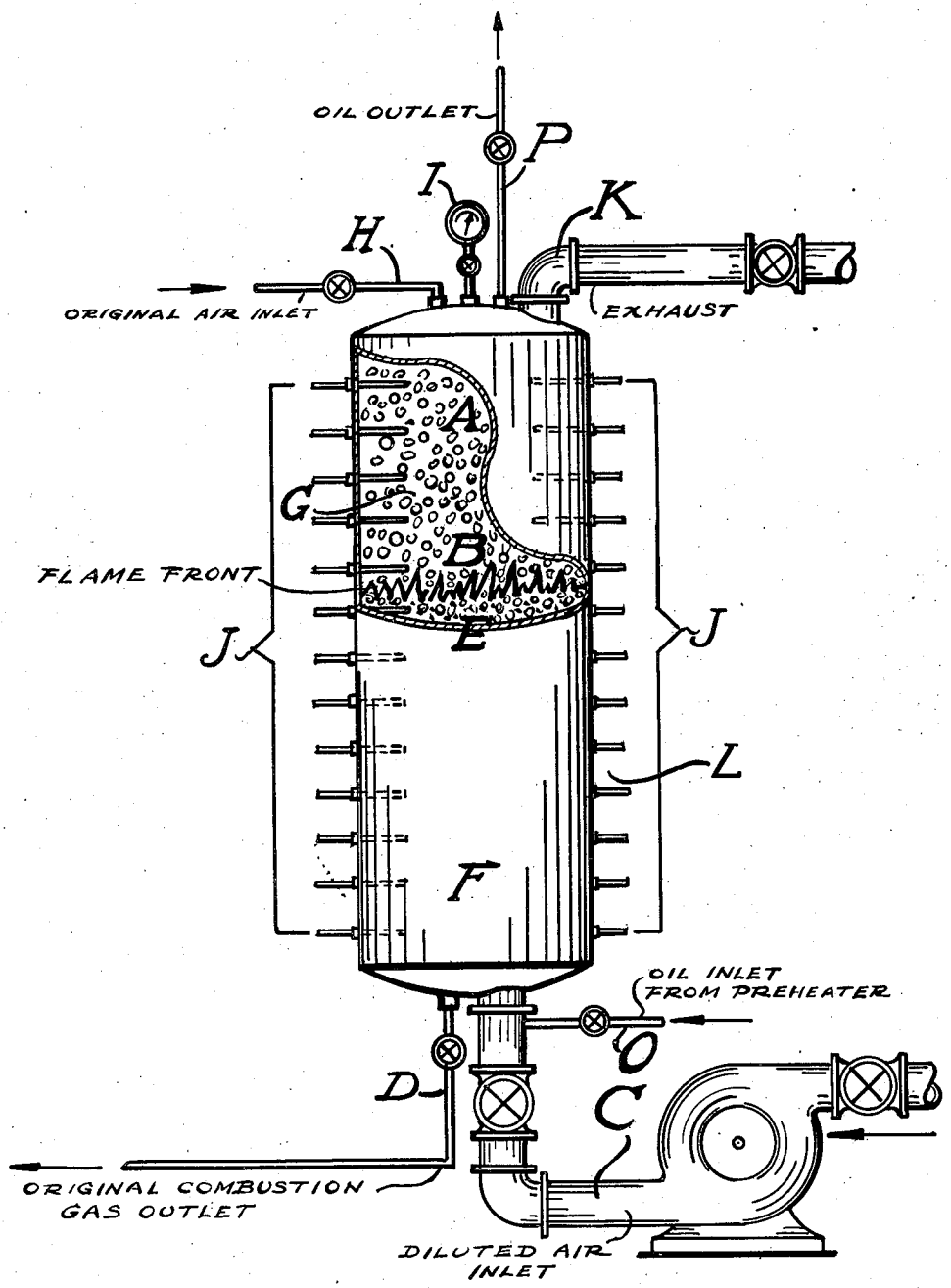

2,162,893

UNITED STATES PATENT OFFICE 2,162,893

CATALYST REGENERATION

Paul E. Kuhl, Madison, N. J., assignor to Standard Oil Development Company, a corporation of Delaware Application September 1, 1938, Serial No. 227,897

7 Claims. (Cl. 23—238)

This invention relates to improvements in the regeneration of catalysts; more particularly it relates to the regeneration of the catalysts of the contact type, such for example, as are used in the conversion of relatively heavy hydrocarbon oils into fractions boiling within the gasoline range.

In using an adsorptive catalytic substance, such as an acid treated clay or a synthetic catalyst of the contact type in the cracking of hydrocarbons, the catalyst loses efficiency due to the deposition of carbonaceous or tarry material upon it and this unavoidably occurs, even where the most careful precautions are taken in manipulating the process. When the accumulation of said carbonaceous or tarry materials amounts to about say 2% to 5%, based on the weight of the catalyst, the efficiency of the catalyst is materially reduced. Numerous proposals have been made for regenerating catalysts including treatment of the said catalyst with various solvents and also combustion of the tarry material or coke in the presence of an oxygen-containing gas.

It is an object of my invention to regenerate a spent catalyst by combustion of the tarry material or coke deposited thereon, in a manner such that overheating, baking, or fusion and consequent impairment of the catalyst is avoided. In regenerating a catalyst by combustion or burning of the tarry material from the catalyst, it is essential that the catalyst, during combustion of the tar or other deposit, is not heated above a certain maximum temperature, say 1100° F., since treating to higher temperatures may cause sintering or fusion of the catalyst and injury to its structure. It is, of course, well known that the physical structure of a catalyst of the contact type plays a very important role in the efficiency of the same in the catalytic reaction.

In the former processes of regeneration by the combustion method, air or air diluted with inert gas, is introduced at an elevated temperature into the reaction chamber containing the catalyst which is also at a high temperature. The tarry material under these conditions ignites at the point of entrance of the oxygen-containing gas and the flame front or active combustion zone gradually proceeds through the catalyst mass until substantially all the tarry material has been consumed. This method has the disadvantage that after the flame has progressed part way through the bed of catalyst, the catalyst which has been regenerated serves to preheat the air passing through it toward the flame front and as a result progressively higher flame front temperatures are produced. Furthermore, the unregenerated catalyst is preheated by combustion gases moving in advance of the flame front, and hence the unregenerated catalytic mass also attains a progressively higher temperature. The passage of hot products of combustion over the unregenerated catalyst in advance of the flame front causes a baking of the tarry or cokey material so that it is difficult to burn and remove the same.

In order to overcome the disadvantages of the former process of regenerating a contact catalyst by the combustion method, I propose to regenerate the catalyst by so manipulating the combustion process that the flame front or active combustion zone moves or is propagated in a direction opposite the flow of oxygen-containing gas supporting the said combustion. In carrying the invention into effect, I first cause ignition of the tarry material deposited on the catalyst at one end of the reaction chamber or reactor, and then introduce an oxygen-containing gas at the other end of the chamber or portion at a temperature below that necessary to support combustion, whereupon the gas passes through the catalyst which is hot and is thus raised to ignition temperatures at the time it reaches the flame front or active combustion zone. The flame front under those conditions necessarily moves through the catalyst in the opposite direction to the flow of oxygen-containing gas, as will appear more fully from the following description.

Reference is now made to the accompanying drawing in which the figure shows in elevation a catalytic oil cracking chamber with some accessory apparatus, the reaction chamber proper being broken away in part to show the catalyst within and indicate a position of the flame front or active combustion zone. It will be understood that, athough not thus fully illustrated, the reaction chamber shown may be of any conventional shape and size and form part of a combination of heaters, vaporizers, fractionating columns, condensers, receivers, conduits and the like, employed in cracking processes. The flow of hydrocarbon oil, during cracking, through the reactor is indicated in the drawing, the oil from the preheaters entering through valved line o and exiting through valved line p.

It will be assumed for purposes of illustration that a catalytic cracking operation has been completed and the valves in lines o and p closed. The catalyst which is at a temperature of say 820° F. contains about 0.6% to 5.0% carbonaceous matter. It is customary first to purge the catalyst, following cracking, with an inert gas such as steam to remove highly volatile hydrocarbon constituents and this may be accomplished by forcing steam through the valved line H into reactor L and withdrawing the steam and volatile material through valved line D. The temperature of the catalytic mass during purging is changed very little.

After purging of the catalyst, heated gas containing oxygen is admitted at the top of chamber L through H and ignition initiated in upper A zone, combustion gases passing downwardly and exhausting at the bottom through D.

Then the initial air supply through H is discontinued and air diluted with nitrogen or carbon dioxide or steam or some inert gas and below ignition temperature, say at 650° F., is forced, for example pumped, into the bottom of the chamber L through C and proceeds upwardly in a direction opposite to the direction of the downwardly moving flame which advances from zone A toward zone G. The gaseous products of combustion exhaust through valved line K.

As indicated in the drawing then, A and G represent original combustion zones or flame fronts and the regenerated catalyst in these regions may be at a temperature of about 900°–1000° F. Also in the drawing the flame front is shown in zone B where a temperature of say 1100° F. prevails. Below the flame front in B in zone E, the temperature may be between 925 and 1000° F. Below E there is a lower region or zone F in which the temperature of the catalyst may be at about 800 to 925° F. The progress of the flame front or combustion zone through the catalyst can be observed by means of thermo-couples J. Thus in the drawing, the thermo-couples in the neighborhood of B would register, as previously stated, 1100° F. Above B, that is, in regenerated regions A and G, the entire body of catalyst is at a temperature of about 900–1000° F.

In order to give more details, it is pointed out that ordinary undiluted air containing about 20% oxygen, admitted through H, may be used to initiate combustion at or above zone A and when it has advanced toward zone G the air supply through H is discontinued and thereafter oxygen-containing gas is supplied through C. The oxygen content of the diluted air entering at C, after the supply through H is discontinued, may be as low as 1%. Furthermore, a back or outlet pressure, indicated by gauge I, of about 5 to 105 lbs./sq. in. in excess of atmospheric pressure with about 40 lbs./sq. in. preferred, may be maintained during regeneration in order to obtain best results. The velocity of the air stream entering through C may be such as to discharge about 3000 volumes of gas, measured at standard conditions, per volume of catalyst per hour. The time required to regenerate a catalyst according to my improved method, is about from 10 to 50 minutes per 3 feet of catalyst bed length.

It is not to be understood that the zones A, B, G, E and F are sharply defined as to limits. They are simply regions where different temperature conditions prevail, at any given time, as evidenced by the readings on thermo-couples J. Thus, B has been called the flame front zone simply because the highest temperature prevails there at the particular time when the process of regeneration had advanced to the point represented in the drawing. And the flame front is considered to be moving downwardly because the thermo-couples, beginning at the top, will indicate a maximum temperature region which moves downwardly during regeneration.

After the operating and purging parts of a catalytic cracking cycle, and when about to introduce oxygen-containing gases for regeneration, another modification of my invention can be practiced as follows: Relatively cool oxygen-containing gas is introduced at a temperature below ignition temperature through C. This gas will cool the spent catalyst at lower F region picking up heat as it passes upwardly through the catalyst. At some point, depending upon rate of flow, catalyst temperature, inlet gas temperature, oxygen concentration and similar variables, it will be sufficiently heated to cause combustion of the tarry material or coke on the catalyst. It will then be further heated by heat of combustion, which will accelerate the rate of burning as it passes through the catalyst. By proper adjustment of gas flow rate, temperature and oxygen concentration, rapid combustion can be limited to a zone near the outlet (upper A) and can be caused to move toward the gas inlet C at the desired downwardly rate by appropriate control of the above variables, for example by increasing the temperature of the oxygen-containing gas at a predetermined rate.

To give more details in connection with this operating modification of my invention, it will again be assumed that the spent catalyst after purging with steam is at a temperature of say 820° F. Gas, containing 1% oxygen and 99% inert gas such as steam, at a temperature of say 600 to 700° F. is introduced at C and passes upwardly adsorbing heat from the hotter catalyst until finally it is sufficiently heated in the region at or above A to cause rapid combustion of the carbonaceous matter at A. Originally at B, E and F no, or merely incipient, combustion occurs. By thereafter gradually increasing the temperature of the oxygen-containing gas entering at C the said gas will arrive at a lower point sufficiently heated to cause rapid combustion. This is to say, the distance from A zone to lower F zone gradually decreases as the zone of rapid combustion moves downwardly and the shortened time of contact of oxygen-containing gas with the catalyst for preheating purposes must be compensated for by gradually increasing the temperature of the incoming gas until finally it must be heated to say 800° F. when the flame front has advanced into zone F.

By operating in either above described method, it is possible to regenerate a catalyst without causing hot spots or local overheating or baking of tarry constituents into the catalytic mass, and consequent injury of the catalyst structure. That is to say, since the catalyst to be regenerated is not preheated by combustion gas in advance of the flame front, prevailing temperatures in the active combustion zone or flame front will be merely that caused by straight combustion and will not have an added heat content, due to heat absorption prior to combustion by the unregenerated catalyst from the hot gaseous products of combustion. A further advantage of my methods of regenerating a catalyst is that the same is kept at a uniform and homogeneous temperature following regeneration. Thus the temperature of the regenerated catalyst may be maintained substantially uniform through its entire mass, which condition is of great aid in the subsequent catalytic reaction.

While the above description has been based on the regeneration of a catalyst used in catalytically cracking relatively heavy hydrocarbon oils, the present regenerating process is obviously applicable to the regeneration of contact catalyst broadly whether they be used in cracking, polymerizing, hydrogenation, oxidation or any other process where a combustible deposit is formed on the said catalyst, thus impairing its effectiveness. Consequently, the present process is applicable to the regeneration of clay, silica and other gels, zeolite, pumice, activated alumina, activated carbon and similar adsorptive bodies employed as catalysts. Also my improved regenerative process is applicable to catalysts whether they be in lump, granular, pellet, or powdered form.

In the foregoing description, no emphasis was placed on any particular manner of disposing the catalyst within the chamber but, for one reason or another, it may, in some process, be desirable to provide 9 to 15 beds of catalyst in a single chamber, in which event, the oxygen-containing gas supply lines and exhaust pipes may conveniently be arranged in a manner taught by the present description and drawing.

Also it is obvious that depending on numerous factors, such as amount of combustible material in the catalyst, the composition of the catalyst, the geometrical form and other factors, that numerous modifications in the above procedure may be made without departing from the spirit of the invention.

Also while the foregoing description was in terms of a vertically disposed bed of catalyst with vertical flow of oxygen-containing gas during regeneration, it is obvious that the same procedure could be applied to a horizontal catalytic bed.

I claim:

1. A method of regenerating a contact catalyst body containing combustible materials which comprises igniting the combustible material at one end of said catalyst body and introducing an oxygen-containing gas at the other end of said catalyst body and effecting a continuous flow of said oxygen-containing gas through the said catalyst body in a direction which is counter-current to the direction of progress of combustion.

2. A method of regenerating a solid catalyst body which comprises initiating combustion at one end of said catalyst body, forcing oxygen-containing gas into the said catalyst body at the end opposite that at which combustion is initiated, the combustion thereafter progressing in a direction opposite that of the flow of the oxygen-containing gas and withdrawing the products of combustion from the catalyst body.

3. A method of regenerating a heated bed of a contact catalyst bed containing combustible materials which comprises igniting the combustible material at one end of said catalyst bed by introducing a supply of heated oxygen-containing gas into the heated catalyst bed at the said end, discontinuing the supply of said gas and at the opposite end, forcing an oxygen-containing gas, into said bed at an inlet temperature below ignition temperature of said tarry materials, but sufficiently high to maintain combustion of said tarry material and effecting a continuous flow of oxygen-containing gas through the said bed in a direction which is counter-current to the direction of progress of the combustion.

4. The process as set forth in claim 3 in which the oxygen-containing gas supporting combustion, after the combustible materials are ignited, is introduced into the catalyst at a temperature of about 600 to 700° F. and thereafter is further heated by contact with the catalyst.

5. A method of regenerating a body of heated catalyst containing combustible material which comprises passing a heated oxygen-containing gas into contact with the heated catalyst, thus causing active combustion of the combustible material in a initial zone and thereafter supplying additional oxygen-containing gas to support further combustion of combustible material by forcing said gas through the catalyst in a direction opposite that of the direction of progress of the active combustion zone through the catalyst body.

6. The process as set forth in claim 3 in which the catalyst is at cracking temperatures at the moment just prior to ignition of the combustible materials and the oxygen-containing gas introduced into the catalyst bed after the ignition, is maintained under a back pressure of from about 5 to about 105 pounds per square inch in excess of atmospheric pressure.

7. The process as set forth in claim 3 in which the oxygen-containing gas has an oxygen concentration of about 1% and is maintained under a back pressure of about 40 pounds in excess of atmospheric pressure.

PAUL E. KUHL.